United States Patent Office 2,739,168
Patented Mar. 20, 1956

2,739,168
GUANIDINIUM SALTS OF N-ALKYLMALEAMIC ACIDS

Joseph J. Carnes and John A. Price, Stamford, Conn., and William T. Booth, Jr., Pittsburgh, Pa., assignors to American Cyanamid Company, New York, N. Y., a corporation of Maine No Drawing. Application April 21, 1953, Serial No. 350,256

10 Claims. (Cl. 260—501)

This invention relates to guanidinium salts of higher N-alkylmaleamic acids wherein the aliphatic or alkyl radical contains from 8 to 18 or more carbon atoms. The invention includes the new salts themselves, their methods of preparation and also textile treating and finishing compositions containing them as will hereinafter be more fully described.

The higher N-alkylmaleamic acids, wherein the alkyl radical contains 8 or more carbon atoms, can be prepared by reacting maleic anhydride with higher primary aliphatic amines. We have found that the guanidinium salts of these acids can be formed by the methods hereinafter described and that these salts possess a number of valuable properties. Thus, for example, we found that they function as antistatic agents when applied to synthetic textile filaments such as threads or yarns of viscose, rayon, Orlon, nylon and the like. Many of the guanidinium salts, and particularly the guanidine and biguanide salts of N-octadecylmaleamic acid, possess excellent softening properties for cotton and rayon cloth. All of our new salts possess foaming and detergent properties in water solution and a number of them, including particularly the biguanide, the phenylguanidine, and the phenylbiguanide salts, possess definite antioxidant and metal deactivating properties. These salts are therefore valuable addition agents to soap, since they serve as combined detergents and soap antioxidants.

Our new salts are most easily prepared by mixing a guanidinium salt of a volatile weak acid, such as the carbonate or bicarbonate, with the desired higher N-alkylmaleamic acid. Preferably an aqueous solution of the guanidinium salt is employed, and the mixture is heated with agitation at 70°–90° C. for about ½ hour, or until the desired salt formation is complete. Other methods of preparation may, however, be employed; thus, for example, guanidine sulfate, biguanide sulfate or other guanidinium sulfates may be reacted with barium hydroxide in aqueous solution to liberate the free base which may then be reacted with the N-alkylmaleamic acid.

The term "guanidinium salts of N-alkylmaleamic acids," as used in the present specification and claims, is intended to designate the salts of the class of guanidines generally, including the unsubstituted and substituted guanidines, biguanides and guanylureas; the term "guanidine salts" being used to describe the salts of guanidine itself. This terminology is based on the recognition that the biguanides and guanylureas are guanyl-substituted and carbamyl-substituted guanidines, respectively; therefore the entire group of salt-forming compounds is properly designated as the guanidines and substituted guanidines. The preferred guanidinium salts of our invention are defined accurately by the formula

R'.NH.C:(NH).NH.X.HO.OC.CH=CH.CO.NHR in which R is an alkyl radical of from 8 to 18 or more carbon atoms, R' is hydrogen or an alkyl or phenyl radical, and X is hydrogen or a guanyl or carbamyl radical; i. e., a

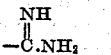

or a

radical.

Any desired unsubstituted or substituted guanidine, guanylurea or biguanide may be used to prepare addition salts of higher N-alkylmaleamic acids in accordance with our invention. A large number of guanidinium salts which may be so used, including their methods of preparation, are described in U. S. Patent No. 2,265,944, and any of the bases described in this patent may be used to prepare higher N-alkylmaleamic acid salts in accordance with our invention. The preferred salts are those prepared with guanidine, mono-alkyl guanidines such as methyl or ethyl guanidine, butyl guanidine, octadecyl guanidine, and the like, prepared by reacting salts of the corresponding primary amines with cyanamide, phenylguanidine, and the corresponding biguanides and guanylureas. Typical compounds of this class are described in detail in the following specific examples.

Any N-alkylmaleamic acid wherein the alkyl radical contains 8 or more carbon atoms may be used. Where the guanidinium salts are intended for use as soap antioxidants, compounds in which the alkyl group contains from 8 to about 12 carbon atoms are preferred, whereas those containing alkyl radicals of 12 to 18 or more carbon atoms are the most effective softening agents and antistatic agents for textiles. All of these compounds are most easily prepared by condensing maleic anhydride with the corresponding primary aliphatic amines; however, fumaric acid or maleic acid may be used instead of maleic anhydride if desired.

The new compounds of our invention are light-colored, waxy solids, all of which are water-dispersible but most of which are only water-soluble to the extent of a few percent. Dilute aqueous solutions containing them foam on shaking and exhibit definite detergency. The compounds are easily applied to textiles, paper and other materials by soaking them in such solutions, followed by drying. Most of our new salts are also soluble in ethanol and other volatile polar organic solvents.

Our invention will be further illustrated by the following specific examples, which describe the preparation of particular guanidinium salts included therein.

EXAMPLE 1

Preparation of N-octadecylmaleamic acid

A commercial octadecylamine was dried by heating under vacuum at 80° C. for two hours and a portion weighing 2216 grams (8 mols) was weighed out.

A reaction flask equipped with a stirrer and thermometer and a steam-jacketed addition funnel was charged with 792 grams of maleic anhydride which was melted by heating on a steam bath. The octadecylamine was then added slowly from the funnel during 2½ hours while maintaining the temperature at about 70°–88° C. after which the reaction mixture was stirred at 85°–90° C. for 30 minutes. The product, N-octadecylmaleamic acid, was poured into trays; it formed a brown solid on cooling. Its neutral equivalent was 390 by titration with sodium hydroxide solution.

EXAMPLE 2

Guanidine N-octadecylmaleamate

A beaker equipped with a stirrer was charged with 115 grams (0.3 mol) of the N-octadecylmaleamic acid of Exmple 1 which was then melted. A solution of 27.5 grams (0.15 mol) of guanidine carbonate dissolved in 400 cc. of water was added and the mixture was stirred slowly at 45°–55° C. for about 2–3 hours. At the end of this time the salt formation was complete and a smooth slurry containing 26.5% solids was obtained. The water was evaporated by tray drying in a current of warm air, leaving the guanidine N-octadecylmaleamate as a light tan solid which was soluble in water to a turbid 1% solution.

The compound was tested as a softener for 5.2 oz. mercerized cotton twill and medium weight rayon suiting by passing the fabrics through its dilute aqueous solution using a pad mangle, adjusted to retain a weight of solution equal to the weight of the fabric, followed by drying on a frame for 5 minutes at 250° F. The treated fabrics were then evaluated by comparing their softness with the untreated fabrics and with other samples treated with commercially acceptable softeners. Both fabrics were rated 'good" when impregnated with 1% and with 0.25% of the softener; in both cases they were rated as being much better than the commercial standard.

EXAMPLE 3

*Biguanide N-octadecylmaleamate*

Free biguanide was prepared by treating 45 grams (0.15 mol) of biguanide sulfate in 400 cc. of water with 47.3 grams of barium hydroxide in 600 cc. of water and filtering off the barium sulfate.

The resulting biguanide solution was added to 117 grams (0.3 mol) of molten N-octadecylmaleamic acid during ten minutes and the mixture was stirred on a steam bath for 90 minutes. Upon cooling it formed a firm white paste containing 15% solids. At 1% concentration a water solution was turbid at 50° C. and precipitated at room temperature.

When applied to cotton and rayon cloth and tested as described in Example 2, the softness rating was "good" both at 1% and at 0.25% concentration and was better than that of the commercial softener used as a standard of comparison.

EXAMPLE 4

*Guanylurea N-octadecylmaleamate*

Free guanylurea was prepared by neutralizing 0.25 gram mols of guanylurea sulfate in 750 cc. of water with 79 grams of barium hydroxide octahydrate. The barium sulfate was removed by filtration, the solution of guanylurea was added to 195 grams (0.5 mol) of the product of Example 1 and the mixture was heated on a steam bath with stirring for one-half hour. Upon cooling the product formed a firm white paste at a concentration of 14%. A 1% solution in water formed a gel at room temperature.

EXAMPLE 5

*Phenylguanidine N-octadecylmaleamate*

To 78 grams (0.2 mol) of the product of Example 1 there was added a slurry of 45 grams (0.2 mol) of phenylguanidine (as a carbonate-bicarbonate mixture with a purity of 77%) in 800 cc. of water. The reaction mixture was refluxed for 2 hours. Upon cooling to room temperature the 10% slurry separated into a liquid and a solid phase. It was dispersible at 1% in water.

EXAMPLE 6

*Guanidine N-dodecylmaleamate*

Using the apparatus and procedure of Example 1, 92.5 grams (0.25 mol) of dodecylamine was added in one-half hour to 49.5 grams (0.505 mol) of molten maleic anhydride. Stirring was continued at 80°–90° C. for an additional one-half hour after which the resulting N-dodecylmaleamic acid was immediately added to a solution of 46 grams (0.25 mol) of guanidine carbonate in 475 cc. of water. The mixture was stirred on a steam bath for two hours at 80°–85° C. and then cooled and allowed to stand at room temperature, whereupon it formed a white 25% slurry. The guanidine N-dodecylmaleamate was recovered from this slurry as a white solid that formed an opalescent 1% solution in water.

EXAMPLE 7

*Guanidine N-octylmaleamate*

To 99 grams (1.01 mols) of molten maleic anhydride there was added 129 grams (1 mol) of n-octylamine over a period of 45 minutes at 63°–75° C. and the mixture was stirred for 15 minutes at 75°–95° C. The resulting N-octylmaleamic acid was neutralized by adding 93 grams (0.5 mol) of guanidine carbonate dissolved in 300 cc. of water and stirring for 30 minutes at 80°–95° C., followed by cooling. At room temperature an amber colored clear solution of 28% solids content was formed, from which the solid guanidine N-octylmaleamate was recovered by evaporation to dryness.

EXAMPLE 8

*Phenylbiguanide N-octadecylmaleamate*

A portion of the N-octadecylmaleamic acid of Example 1 weighing 78 grams (0.2 mol) was neutralized with a solution of 36 grams (0.2 mol) of phenylbiguanide in 500 cc. of water. The mixture was stirred on a steam bath at 75°–85° C. for 30 minutes and then cooled. At room temperature it was a thin tan paste having a solids content of 18%. A 1% aqueous solution was viscous and turbid.

EXAMPLE 9

*N-butylguanidine N-octadecylmaleamate*

A solution of 43.5 grams (0.2 mol) of N-butylguanidine sulfate in 500 cc. of water was treated with 31.6 grams of barium hydroxide in 400 cc. of water.

After filtering off the precipitated barium sulfate the free N-butylguanidine solution was added to 78 grams (0.2 mol) of molten N-octadecylmaleamic acid during fifteen minutes. The mixture was stirred on a steam bath for 2 hours. The smooth mixture was poured into a tray and the water evaporated with a current of warm air. The resulting N-butylguanidine N-octadecylmaleamate was a light brown solid which dissolved in water to form turbid 1% solutions.

What we claim is:
1. Guanidinium salts of N-alkylmaleamic acids wherein the alkyl radical contains from 8 to 18 carbon atoms.
2. N-alkylmaleamic acid salts of the formula

R'NH.C:(NH).NHX.HO.OC.CH=CH.CO.NHR in which R is an alkyl radical of 8 to 18 carbon atoms, R' is a member of the group consisting of hydrogen, alkyl and phenyl radicals and X is a member of the group consisting of hydrogen and the guanyl and carbamyl radicals.
3. Guanidinium salts of N-octadecylmaleamic acid.
4. Guanidinium salts of N-dodecylmaleamic acid.
5. Guanidinium salts of N-octylmaleamic acid.
6. The guanidine salt of N-octadecylmaleamic acid.
7. The guanidine salt of N-dodecylmaleamic acid.
8. The guanidine salt of N-octylmaleamic acid.
9. The biguanide salt of N-octadecylmaleamic acid.
10. The guanylurea salt of N-octadecylmaleamic acid.

References Cited in the file of this patent
UNITED STATES PATENTS 2,383,130    Jaeger et al. _____ Aug. 21, 1945